June 17, 1941. W. FORSTNER 2,246,091

KEY CHAIN CONSTRUCTION

Filed April 25, 1939

INVENTOR
William Forstner
BY Nathaniel Frucht
ATTORNEY

Patented June 17, 1941

2,246,091

UNITED STATES PATENT OFFICE 2,246,091

KEY CHAIN CONSTRUCTION

William Forstner, Irvington, N. J., assignor to Forstner Chain Corporation, a corporation of New Jersey Application April 25, 1939, Serial No. 269,941

2 Claims. (Cl. 24—3)

My present invention relates to the jewelry art, and has particular reference to flexible chain constructions.

It is the principal object of my invention to provide an extension arrangement for flexible chains and the like.

Another object of my invention is to provide an extension arrangement suitable for key chains, neck chains, bracelets, and other jewelry articles having flexible chain parts.

An additional object of my invention is to provide an improved releasable friction lock for a slidable extensible chain.

A further object of my invention is to provide an end connection for a flexible chain designed to prevent a sharp angle of bend tending to break or snap the flexible chain.

With the above and other objects and advantageous features in view, my invention consists of a novel arrangement of parts more fully disclosed in the detailed description following, in conjunction with the accompanying drawing, and more specifically defined in the claims appended thereto.

I have devised a novel construction which utilizes a friction lock for flexible chains, and particularly flexible chains which are used for key chains, bracelets, and the like. The use of a friction lock results in a structure having few parts, and reduces both manufacturing and assembly cost. To this end, I provide a friction lock which utilizes a compressible gripping material, the preferred material being cork. In using the friction lock for a key chain arrangement, I have found it advisable to use an end hook connection having an extended torus guide surface, for providing a proper curvature for the chain end and thus prevent too sharp a bend and resultant breakage or permanent distortion.

Figure 1:
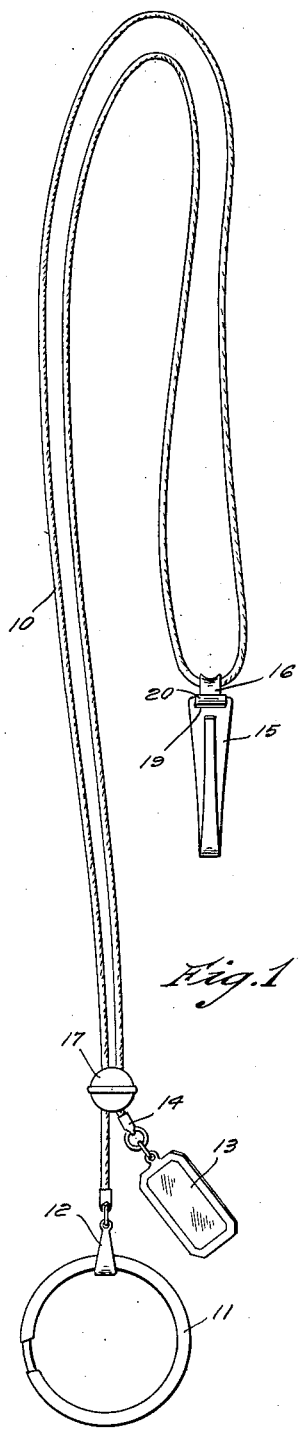
Fig. 1 is a view of the novel invention as applied to a key chain.

Referring to the drawing, the novel invention may be applied to a key chain as illustrated in Fig. 1, a flexible chain 10 being connected at one end to a key ring of any desired design 11, by means of an end connection 12. The key chain is preferably of elongated length, the other end terminating in an ornamental pull tab or the like 13, which may be suitably engraved or marked, and which is connected to its end of the key chain by means of an end connection 14, an apparel fastener 15 such as a belt hook or the like is slidably mounted on the flexible chain intermediate the ends by means of an end connection 16, and a friction lock 17 is mounted so that both ends of the chain pass therethrough in frictional engagement therewith.

Figure 5:
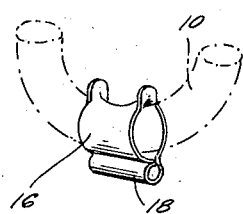
Fig. 5 is a perspective view of the novel end connection.

The above arrangement has been found very satisfactory, as both ends of the flexible chain 10 are frictionally releasably held in the friction lock 17, whereby pulling the friction lock along either end of the chain draws the other end therewith, but permits movement of the other end therethrough if desired. The end connection 16, see Fig. 5, includes a hinge roll 18 to which the hook 15 is swivelly attached, as by having a slot 19 stamped therein to provide an end bar 20 which is received within the hinge roll 18, the end connection being adapted to slide freely over the flexible chain 10 and being torus shaped to conform therewith, the angle of the end connection being such as to prevent abrupt bending or kinking of the chain 10 when passing therethrough.

Figure 2:
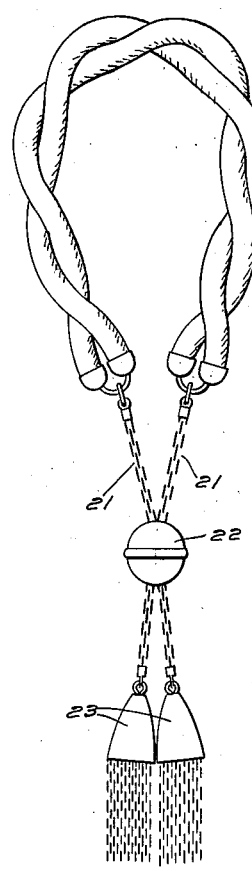
Fig. 2 is a view of the novel invention as applied to a bracelet.

The friction lock may be applied to a bracelet 20, as disclosed in Fig. 2, the ends of the bracelet being provided with flexible chain ends 21 which pass through the friction lock 22, and which terminate in enlarged end pieces 23, preferably in the form of tassels. With this arrangement, the bracelet may be readily lengthened for removal from the wrist, and may be shortened by pulling one or both of the flexible chains 21 through the friction lock 22.

Figure 3:
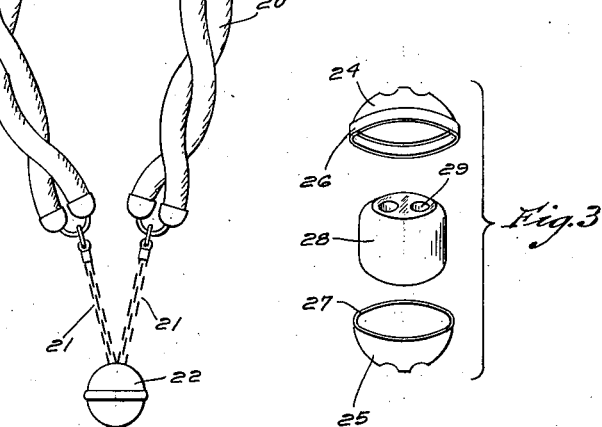
Fig. 3 is a detailed view showing the constituent parts of the friction lock.
Figure 4:
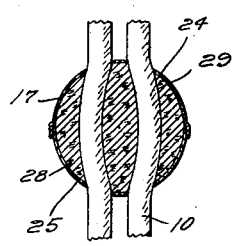
Fig. 4 is a sectional view through the friction lock, showing a slight distortion of the flexible chain.

Any suitable type of friction lock may be used, the preferred form consisting of an upper metal shell stamping 24, see Fig. 3, and a lower metal shell stamping 25, the two shells being preferably adapted to interlock, as by means of an arcuate rim 26 on one shell into which the rim 27 of the other shell is forced to be permanently locked therein, a compressible material 28 being positioned between the two shells so as to be tightly clamped therebetween. The preferred material is a cylinder of cork, which has suitable passages 29 therethrough for receiving the flexible chain, these passages being of relatively smaller diameter, whereby the sides exert a frictional grip on the chain therein. As best shown in Fig. 4, the interlocking mounting of the upper and lower shells compresses the cork cylinder therebetween, and so results in a slight distortion of the passage 29, so as to impose an additional frictional resistance to passage of the flexible chain therethrough. Any desired amount of compression may be imparted to the frictional lock, so as to provide a desired twist in the passage 29 to thus increase the frictional engagement of the side walls of the passages 29 with the flexible chains passing therethrough.

It is thus evident that I have provided an improved frictional lock for the two ends of a flexible chain or the like, or for the two ends of a bracelet, which permits passage or pulling of either chain end therethrough, but which firmly frictionally retain the chain in position unless manually moved. The use of cork provides a compressible material which has long life, and which exerts sufficient pressure for the purpose described; the use of an end connection prevents sharp bending of the flexible chain and adds to the life of the chain, wherefor all the parts cooperate to increase the effectiveness of the articles of jewelry described. The end connection and the flexible lock may be applied to other articles of jewelry having flexible chain portions, and to articles having metal wire or rod members.

While I have described specific constructional embodiments of my invention, it is obvious that changes in the size and proportions of the parts and in the materials used to meet the requirements for different jewelry designs, may be made without departing from the spirit and the scope of the invention as defined in the appended claims.

I claim:

1. In a key chain, a flexible chain of elongated length normally looped at the center to provide two substantially adjacent end portions, a key retainer secured to one end portion, a pull element secured to the other end portion, a garment attaching device having a chain channel portion of arcuate shape and extended length and slidably receiving the chain loop, and a friction grip element having non-linear passages extending therethrough and slidably frictionally receiving said substantially adjacent chain portions.

2. In a key chain, a flexible chain of elongated length normally looped at the center to provide two substantially adjacent end portions, a key retainer secured to one end portion, a pull element secured to the other end portion, a garment attaching device having a chain channel portion of arcuate shape and extended length and slidably receiving the chain loop, and a friction grip element comprising compressed cork having non-linear passages extending therethrough and slidably frictionally receiving said substantially adjacent chain portions.

WILLIAM FORSTNER.